(12) United States Patent
Yuksel

(10) Patent No.: US 11,628,927 B2
(45) Date of Patent: Apr. 18, 2023

(54) METHOD OF CONTROLLING AN ACTUATOR SYSTEM AND AIRCRAFT USING SAME

(71) Applicant: Volocopter GmbH, Bruchsal (DE)

(72) Inventor: Burak Yuksel, Heidelberg (DE)

(73) Assignee: Volocopter GmbH, Bruchsal (DE)

( * ) Notice: Subject to any disclaimer, the term of this patent is extended or adjusted under 35 U.S.C. 154(b) by 319 days.

(21) Appl. No.: 16/995,065

(22) Filed: Aug. 17, 2020

(65) Prior Publication Data

US 2021/0107626 A1 Apr. 15, 2021

(30) Foreign Application Priority Data

Oct. 9, 2019 (EP) ..................................... 19202263

(51) Int. Cl.
*B64C 13/16* (2006.01)
*B64C 39/02* (2023.01)
(Continued)

(52) U.S. Cl.
CPC ............ *B64C 13/16* (2013.01); *B64C 39/024* (2013.01); *G05D 1/0066* (2013.01); *B64U 10/13* (2023.01); *B64U 50/19* (2023.01); *B64U 2201/10* (2023.01)

(58) Field of Classification Search
CPC . B64C 13/16; B64C 39/024; B64C 2201/027; B64C 2201/042; B64C 2201/141; G05D 1/0066
See application file for complete search history.

(56) References Cited

U.S. PATENT DOCUMENTS

| | | | |
|---|---|---|---|
| 9,146,557 B1 | 9/2015 | Ahmed et al. | |
| 2012/0091260 A1* | 4/2012 | Callou | G05D 1/0858 244/17.13 |

(Continued)

FOREIGN PATENT DOCUMENTS

| | | |
|---|---|---|
| DE | 102019101903 | 7/2020 |
| EP | 1901153 | 3/2008 |

OTHER PUBLICATIONS

Tedrake, Russ, "Underactuated Robotics: Learning, Planning, and Control for Efficient and Agile Machines Course Notes for MIT 6.832", https://homes.cs.washington.edu/-tudorov/courses/amath579/ Tedrake_notes.pdf, retrieved Mar. 25, 2020, pp. 12-44 and 60-68, Mar. 10, 2009.

(Continued)

*Primary Examiner* — Peter D Nolan
*Assistant Examiner* — Roy Rhee
(74) *Attorney, Agent, or Firm* — Volpe Koenig, P.C.

(57) ABSTRACT

A method of operating an under-actuated actuator system including a plurality of actuators (3), preferably for operating a multiactuator aerial vehicle (1), wherein the actuators (3) are individual propulsion units of the multiactuator aerial vehicle (1), each actuator having a maximum physical capacity $u^{max}$, the method including: controlling the actuators (3) by with an actual control input $u \in \mathbb{R}^k$ computed (Continued)

from an allocation equation $u = D^{-1} u_p$, wherein $D^{-1}$ is an inverse allocation matrix and $u_p \in \mathbb{R}^m$ is a pseudo control input defined by a system dynamics equation $m(x)\ddot{x} + c(x,\dot{x}) + g(x) + G(x)u_p = f_{ext}$, wherein $x \in \mathbb{R}^n$ is an n-dimensional configuration vector of the system, $m(x) \in \mathbb{R}^{n \times n}$ is a state dependent generalized moment of inertia, $c(x,\dot{x}) \in \mathbb{R}^n$ are state dependent Coriolis force, $g(x) \in \mathbb{R}^n$ are gravitational forces and $f_{ext} \in \mathbb{R}^n$ are external forces and torques, and $G(x) \in \mathbb{R}^{n \times m}$ is a control input matrix which contains the information of under-actuation. The system is under-actuated if Rank $(G(x)) < n$ or both under-actuated and overly determined in case of $k > m > n$ and Rank $(G(x)D) < n$, with $k,m,n \in \mathbb{N}$; using state feedback control to recurrently compute a desired pseudo control input $u_p$ from the system dynamics equation. If at least one component of the desired pseudo control input $u_p$ is greater than a corresponding maximum pseudo control input $u_p^{max}$ that can be generated based on the actuator maximum physical capacity $u^{max}$ and based on positions (or characteristics and configurations) of the actuators within the system, prioritizing at least one of the components of $u_p$ over the other components of $u_p$; and a) by using a prioritizing algorithm, solving the allocation equation for the at least one prioritized component of $u_p$ before solving the allocation equation for the remaining components of $u_p$; or b) during state feedback control, adjusting a limiting value of the at least one prioritized component of $u_p$ by an amount, while keeping respective limiting values of the remaining components of $u_p$ essentially constant.

15 Claims, 5 Drawing Sheets

(51) Int. Cl.
  *G05D 1/00* (2006.01)
  *B64U 10/13* (2023.01)
  *B64U 50/19* (2023.01)

(56) References Cited

U.S. PATENT DOCUMENTS

2012/0232718 A1* 9/2012 Rischmuller .......... A63H 30/04
  701/2
2020/0116751 A1* 4/2020 Tang ..................... G05D 1/0825

OTHER PUBLICATIONS

Andrade, Richard et al., Model predictive control of a tilt-rotor UAV for load transportation, 2016 European Control Conference (ECC0 IEEE, pp. 2165-2170, retrieved Jan. 6, 2017, Jun. 29, 2016.

Khelfi, Mohamed Faycal, et al., "Robust control with sliding mode for a quadrotor unmanned aerial vehicle." Industrial Electronics (ISIE), 2012 IEEE Internatonal Symposium on, IEEE, pp. 886-892, May 28, 2012.

* cited by examiner

METHOD OF CONTROLLING AN ACTUATOR SYSTEM AND AIRCRAFT USING SAME

INCORPORATION BY REFERENCE

The following documents are incorporated herein by reference as if fully set forth: European Patent Application No. 19 202 263.0, filed Oct. 9, 2019.

TECHNICAL FIELD

The invention relates to a method of controlling an actuator system comprising a plurality of actuators, preferably for controlling a multiactuator aerial vehicle, wherein said actuators are preferably devised as individual propulsion units of the multiactuator aerial vehicle.

The invention also relates to an aircraft, in particular an electrically propelled VTOL (vertical take-off and landing) aircraft, comprising an actuator system with a plurality of actuators, wherein said actuators are devised as individual propulsion units of the aircraft.

BACKGROUND

In overly determined actuator systems, e.g. multiactuator aerial vehicles (MAVs), wherein each actuator may be identified as a propulsion unit of the aircraft, there are different possibilities to achieve given tasks, such as a given flight direction. The given task can be allocated in different ways/portions to the different actuators. In other words: each one of the actuators receives a corresponding control signal to control its operation, so that the joint operation of all actuators can achieve said given task (e.g., fly in a desired direction). One way to achieve this has been described in German application DE 10 2019 101 903, filed by the present applicant.

However, DE 10 2019 101 903 does not address the additional problem of how to specify certain control tasks in multiple actuator systems which arise when it is no longer possible to fulfill all desired control tasks, e.g., due to actuator malfunction or failure.

SUMMARY

It is the object of the present invention to provide an allocation method for under-actuated and/or overly determined actuator systems in the form of a method of controlling an actuator system comprising a plurality of actuators, which addresses the additional problem of how to specify certain control tasks in multiple actuator systems which arise when it is no longer possible to fulfill all desired control tasks (degradation of control authority), e.g., due to actuator malfunction or failure, in particular in connection with a multiactuator aerial vehicle (MAV).

The object is achieved by means of a method of controlling an actuator system and by an aircraft (or MAV) having one or more features of the invention. Advantageous further embodiments are defined below and in the claims.

According to a first aspect of the present invention, there is proposed a method of controlling an actuator system comprising a plurality of actuators, preferably for controlling a multiactuator aerial vehicle, wherein said actuators are preferably devised as individual propulsion units of the multiactuator aerial vehicle. The method comprises: controlling the actuators with an actual control input $u \in \mathbb{R}^k$ (i.e., a corresponding control signal) computed from an allocation equation $u=D^{-1}u_p$, wherein $D^{-1}$ is an inverse allocation matrix and $u_p \in \mathbb{R}^m$ is a pseudo control input defined by a system dynamics equation $M(x)\ddot{x}+c(x,\dot{x})+g(x)+G(x)u_p=f_{ext}$, wherein $x \in \mathbb{R}^n$ is an n-dimensional configuration vector of the system, $M(x) \in \mathbb{R}^{n \times n}$ is a state dependent generalized moment of inertia, $c(x,\dot{x}) \in \mathbb{R}^n$ are state dependent Coriolis forces, $g(x) \in \mathbb{R}^n$ are gravitational forces, $f_{ext} \in \mathbb{R}^n$ are external forces and torques, and $G(x) \in \mathbb{R}^{n \times m}$ is a control input matrix which contains the information of underactuation, where the system is said to be under-actuated if Rank $(G(x))<n$ or both under-actuated and overly determined in case of $k>m>n$ and Rank $(G(x)D)<n$, with $k,m,n \in \mathbb{N}$; using state feedback control to recurrently compute a desired pseudo control input $u_p$ from said system dynamics equation; if at least one component of said desired pseudo control input $u_p$ is greater than a corresponding maximum pseudo control input $u_p^{max}$ that can be generated based on e.g. said actuator maximum physical capacity $u^{max}$ and based on positions (or other characteristics/configuration) of the actuators within the system, or if the actuator system comes to its allowed control volume limit (i.e., $u_p>u_p^{max}$) without individual actuators reaching their own limits ($u^{max}$), e.g. if all actuators are very close to their respective limits $u^{max}$, prioritizing at least one of the components of $u_p$ over the other components of $u_p$; and a) by means of a prioritizing algorithm, solving said allocation equation for said at least one prioritized component of $u_p$ before solving said allocation equation for the remaining components of $u_p$; or b) during feedback control, adjusting a limiting value of said at least one prioritized component of $u_p$ by an amount, while keeping respective limiting values of the remaining components of $u_p$ essentially constant.

In the present context, "configuration of the actuators" refers to the configuration of the actuators in the system, e.g., on the aircraft, i.e. their geometric locations (position and rotation) and other characteristics e.g. thrust and torque curves for a rotor, output shaft torque of a motor, etc.

Further, according to a second aspect of the present invention, there is proposed an aircraft or MAV, in particular an electrically propelled VTOL aircraft (eVTOL), comprising: an actuator system comprising a plurality of actuators, wherein said actuators are devised as individual propulsion units of the aircraft, wherein said actuators, during operation, are adapted to receive, from at least one flight control unit or flight controller, a control input $u \in \mathbb{R}^k$, $k \in \mathbb{N}$, i.e., a respective component thereof, wherein said flight control unit comprises a feedback control unit and an allocation unit implemented by the controller, wherein said control input u is determined by means of at least one computer algorithm performed on said at least one flight control unit, preferably on board the aircraft and/or in real time, most preferably by said allocation unit, wherein i) the at least one flight control unit, by means of said feedback control unit, is adapted to perform the method according to said first aspect of the present invention, case b), and/or ii) the at least one flight control unit, by means of said algorithm, is adapted to perform the method according to said first aspect of the present invention; and a respective control input u is supplied to said actuators.

The (allocation) method according to the invention can be applied for a wide class of systems, e.g. aircraft, robots, under-actuated and/or overly determined systems, etc. For better understanding, the equations of motion of such systems, which can be derived using the Newton-Euler principle or the Lagrange method are depicted as follows:

$$M(x)\ddot{x}+c(x,\dot{x})+g(x)+G(x)u_p=f_{ext}, \quad \text{(Equation 1)}$$

As already given above, where $x \in \mathbb{R}^n$ is n-dimensional configuration vector of the system, e.g. positions and rotations in 3D, $M(x) \in \mathbb{R}^{n \times n}$ is the state dependent generalized moment of inertia, $c(x,\dot{x}) \in \mathbb{R}^n$ are the state dependent Coriolis forces, $g(x) \in \mathbb{R}^n$ stand for the gravitational forces, and $f_{ext} \in \mathbb{R}^n$ are the external forces and torques, e.g. due to aerodynamics, collisions, etc. "State" denotes a (physical) state of the system under consideration, e.g., an aircraft (MAV). A so-called pseudo control input $u_p \in \mathbb{R}^m$ can be defined, which is used to control the (actuator) system. This pseudo-control input (which in Multiactuator Aerial Vehicles equals a collective thrust and torques acting on the aircraft owing to the functioning of its actuators (e.g., propulsion units)) enters into the system dynamics as given by Equation 1 after modification with a so-called control input matrix $G(x) \in \mathbb{R}^{n \times m}$. This matrix contains the information of, e.g., under-actuation, where the system is said to be under-actuated if Rank $(G(x)) < n$, as known to the skilled person.

Note that a system can be both under-actuated and overly determined, i.e., in case of k>m>n or Rank $(G(x)D) < n$.

Allocation takes place between the actual control input $u \in \mathbb{R}^k$ and the pseudo control input $u_p \in \mathbb{R}^m$ via $$u_p = Du, \quad \text{(Equation 2)}$$

wherein $D \in \mathbb{R}^{m \times k}$ is defined as allocation matrix.

Using state feedback control laws implemented by means of abovementioned feedback control unit (which for MAV-VTOL comprise, e.g., attitude, altitude, position/velocity control, path/trajectory tracking, etc.) and based on the system dynamics described in Equation 1, one can compute a desired pseudo control input $u_p$. This, however, needs to be distributed to the physical actuators by means of actual control input u. Hence, an inverse matrix computation is needed in order to compute $u_p$ from u. This is depicted by $$u = D^{-1} u_p \quad \text{(Equation 3)}$$

where $D^{-1}$ can be direct or weighted inverse operation. A basic idea underlying the present invention considers that one or more components of the demanded control inputs $(u_p)$ reach a threshold $(u_p^{max} \in \mathbb{R}^m)$, where $u_p^{max}$ contains the threshold values of each one of the components of $u_p$, which components can be decided heuristically. These heuristically set values are less than the control volume limit of the system (i.e., physically possible values for $u_p$). Hence, $u_p^{max}$ implies that the actuators are solicited with respective control values that are close to their physical capacities. In this case, if at least one dimension of the actual or demanded pseudo control $uu_p$ reaches a physical performance limit, a task prioritization algorithm can be proposed. This does not necessarily imply that actuators must be in saturation, but can also be appropriate when the system experiences external disturbances e.g. wind, physical contact, etc, or if actuators are lost, e.g. due to malfunction, a bird strike, collision with another flying object e.g. a drone, etc.

Therefore, within the context of the present invention (i.e. the method according to the present invention), a task prioritization algorithm for MAV-VTOLs, e.g. for a generic quadrotor, octorotor or Volocopter is proposed. However, the prioritization algorithm is not limited to such applications and can be applied to any underactuated and/or overly determined actuator system used in an aircraft.

The pseudo-control inputs of MAV-VTOL systems can be written as $u_p = [u_t, \tau_x, \tau_3, \tau_z]^T \in \mathbb{R}^4$ (i.e. m=4 in Equation 2), where $u_t$ is the collective thrust, and $\tau_*$ are the body-fixed frame control torques around the body axes, which are $* = \{x,y,z\}$. These systems are intrinsically under-actuated, since their motion is in three dimensions (three positions and three rotations, i.e. n=6, while the control dimension is only four, i.e. m=4). Consider that roll is around the x axis, pitch is around the y axis, and yaw is around the z axis of a (Cartesian) coordinate system.

In a corresponding embodiment of the method according to the invention, in the case of a multiactuator aerial vehicle, $u_p = [u_t, \tau_x, \tau_y, \tau_z]^T \in \mathbb{R}^4$, where $u_t$ is a collective thrust, and $\tau_*$ are body-fixed frame control torques around the body axes, which are $* = \{x,y,z\}$, $\tau_x$ being a roll torque, $\tau_y$ being a pitch torque, and $\tau_z$ being a yaw torque. Note that said torques have been named "roll", "pitch" an "yaw" torques for a better understanding by a more generic community. Their correct definition should be: r is the torque around the body-frame *-axis.

Now, if the aircraft is under demand, e.g., due to external disturbances or some malfunction of the actuators or for other reasons, then one or more components of $u_p$ might come to their allowed limits. u In that case, if a task demands that more than one dimension of $uu_p$ shall be greater or equal to the available $u_p u$, then there is a need to prioritize one of said dimensions over another. As a specific example, it could be that a task requires both thrust $u_t$ and roll torque $T_x$ to be greater or equal than the available corresponding control values. Then, there is a need to prioritize, e.g., roll $\tau_x$ over thrust $u_t$. This means that roll is determined first in order to achieve an acceptable corresponding control value, and thrust is determined afterwards, which implies that a desired value for the thrust cannot be (fully) achieved.

It should be noted that, in order to do a prioritization, it is not necessarily required that at least an actuator actually reaches saturation (or is lost). However, if the system as such is designed for tasks such that without actuator saturation or loss it can deliver any (reasonable) demanded control volume in all dimensions, then no prioritization might be needed at all.

A basic logic that can be employed in corresponding embodiments of the present invention, which are directed to MAV actuator systems, comprises at least some of the following principles:

Always prioritize $\tau_x$ (roll torque) and $\tau_y$ (pitch torque) over other components of $u_p$. In other words: roll torque $\tau_x$ and pitch torque $\tau_y$ can be pre-selected, while yaw torque $\tau_z$ and collective thrust $u_t$ can be considered as other components of $u_p$, as defined in the claims. Since an MAV-VTOL is under-actuated, losing control authority in either roll or pitch will result in a translational change in horizontal direction, which should be avoided.

Prioritize $\tau_z$ (yaw torque) over $u_t$ (collective thrust), if a translational (especially a horizontal) velocity of the vehicle, e.g. an aircraft, is greater than a threshold value (given, e.g., in m/s) and if an altitude of the vehicle, e.g. an aircraft, is greater than another threshold value (given, e.g., in meters). In this way, in case a prioritization is needed and if the vehicle, e.g. an aircraft, is away from the ground at high velocity, a heading of the aircraft is protected, while height is sacrificed instead.

Prioritize $u_t$ over $\tau_z$, if a translational velocity of the vehicle, e.g. an aircraft, is less than a threshold value (given, e.g., in m/s) and if an altitude of the vehicle, e.g. an aircraft, is less than another threshold value (given, e.g., in meters). In this way, in case a prioritization is needed and if the vehicle, e.g. an aircraft, is near ground, altitude is protected, and yaw alignment is sacrificed instead.

While this particular prioritization logic is MAV-VTOL specific, it can be extended or changed depending on the system by a person skilled in the art.

In a corresponding embodiment of the method according to the invention, in case of a), at least one of the components of $u_p$ can be pre-selected, as stated above, preferably permanently pre-selected, and solving said allocation equation can comprise solving said allocation equation for said at least one pre-selected component of $u_p$ before solving said allocation equation for the other components of $u_p$. In this way, achieving a desired control input for this particular component is promoted.

In a further embodiment of the method according to the invention, in case of a plurality of pre-selected components of $u_p$, solving said allocation equation for said pre-selected components of $u_p$ can comprise solving said allocation equation for said plurality of pre-selected components of $u_p$ at a same time. In this way, achieving a respective desired control input for these particular components is promoted.

In another embodiment of the method according to the invention, solving said allocation equation for said other components of $u_p$ can comprise solving said allocation equation for said other components of $u_p$ at a same time, if said at least one component of said desired $u_p$ which is greater than said corresponding maximum pseudo control input $u_p^{max}$ is a pre-selected component of $u_p$.

As detailed by way of example involving heading and height above, in a preferred embodiment of the method according to the invention, preferably if said at least one component of said desired $u_p$ which is greater than said corresponding maximum pseudo control input $u_p^{max}$ is not a pre-selected component of $u_p$, at least one physical threshold value is defined and compared to a current (measured) value of a corresponding state variable of the system; and an order of solving said allocation equation for the other components of $u_p$ is determined based on a result of said comparison.

Since the physical capacity of each actuator (as defined further up by $u^{max}$) and a location (or position) of each actuator in the system (aircraft) is/are known, one also has knowledge of a maximum thrust and maximum torques the system (aircraft) can generate. This has been previously defined as $u_p^{max}$. If a desired control input $u_p$ as determined from feedback control law (i.e., by means of said feedback control unit using Equation 1) is greater than $u_p^{max}$ for at least one of $u_t, \tau_x, \tau_y, \tau_z$, i.e., collective thrust as well as torques around roll, pitch and yaw axes, respectively, then a prioritization between collective thrust and these three torques will be required.

As defined in the context of the present invention, two alternative ways of realizing this prioritization are proposed:

During control allocation, i.e., by means of said allocation unit: A prioritization algorithm preferably solves Equation 3 for demanded control input components $\tau_x$ and $\tau_y$, first. Then, if $\tau_x$ is defined with higher priority than $u_t$, Equation 3 is further solved for $\tau_x$ and then for $u_t$. However, if $u_t$ has higher priority than $\tau_z$, Equation 3 is further solved for $u_t$ and then for $\tau_x$. In this place, one can also reduce the upper limits of $u_t$ or $\tau_x$ appropriately.

In feedback control: Note that $\tau_x, \tau_y, \tau_x$ are attitude torques and $u_t$ is the altitude thrust, which in combination define the pseudo control input $u_p$. This pseudo control input $u_p$ is preferably computed using known feedback control laws, e.g., attitude and altitude controllers in said feedback control unit. Hence, prioritizing, e.g. $u_t$ over $\tau_z$, implies prioritizing, e.g., an altitude/thrust controller over, e.g., a yaw controller comprised in said feedback control unit. In that case, one way of achieving the object of the invention would be to reduce an upper limit value of $u_t$ (e.g., from 100% to 90%) while keeping an upper limit value of $\tau_z$ essentially constant (or reducing it to a lesser extent). $u_p$ In a corresponding embodiment of the method according to the invention, in case of b), adjusting said limiting value of said at least one prioritized component of $u_p$ by an amount can comprise reducing said limiting value, preferably by a percentage of an initial value thereof, which initial value may correspond to 100%.

In a further embodiment of the aircraft according to the invention, the aircraft comprises at least one of sensor units (or sensors), estimation units and output units in operative connection with said feedback control unit for providing sensor data, estimation data or output data, respectively, representative of a physical and operational state of the aircraft to said feedback control unit, wherein the at least one flight control unit is devised to determine said desired pseudo control input $u_p$ from said sensor data, estimation data or output data, respectively. In this way, a quality of determining said desired pseudo control input $u_p$ can be enhanced.

In yet a further embodiment of the aircraft according to the invention, the aircraft comprises at least one of sensor units, estimation units and output units in operative connection with said allocation unit for providing sensor data, estimation data or output data, respectively, representative of a physical and operational state of the aircraft to said allocation unit, wherein the at least one flight control unit is devised to determine said actual control input u from said desired pseudo control input u and from said sensor data, estimation data or output data, respectively. In this way, a quality of determining said actual control input u can be enhanced.

In another embodiment of the aircraft according to the invention, said feedback control unit and said allocation unit are operatively connected, and said feedback control unit is adapted to provide said desired pseudo control input $u_p$ to said allocation unit, which allocation unit is adapted to solve allocation equation $u=D^{-1}u_p$ and to output control input u to said actuators.

BRIEF DESCRIPTION OF THE DRAWINGS

Further features and advantages of the invention will now be described with reference to the appended drawings, which illustrate specific embodiments of the invention by way of example.

DETAILED DESCRIPTION

Figure 1:
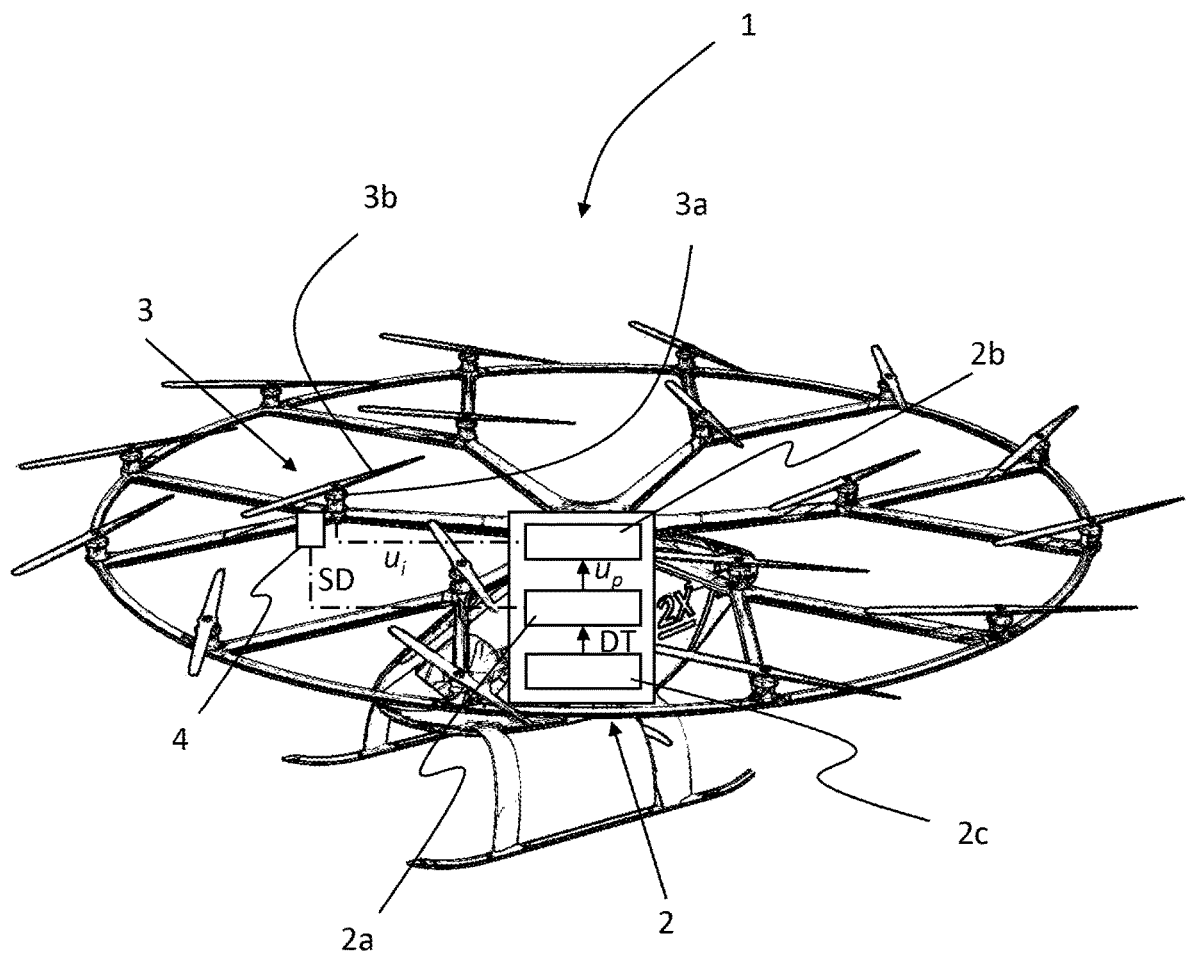
FIG. 1 shows a schematic drawing of an aircraft according to the invention.

FIG. 1 shows an exemplary MAV-eVTOL aircraft denoted by reference numeral 1. Aircraft 1 has a flight control unit (or flight controller) 2 which is in operational connection with a plurality of actuators 3 in the form of aircraft propulsion units, each having an electric motor 3a and a propeller 3b. Only one actuator is explicitly marked in FIG. 1 for reason of clarity. According to the example of FIG. 1, in a vicinity of (each) actuator 3 at least one sensor 4 is located for measuring an operational state of the actuator 3. This may comprise without limitation measuring a temperature, an electrical/mechanical power consumption, a rotational velocity (RPM) etc. of the actuator, in order to determine its present operational state and health status (e.g., overheated). There are many more flight relevant sensors onboard the aircraft 1 (which can be placed in various locations, e.g. in vicinity of the flight control unit 2, of the at least one sensor 4 or in other places), which determine flight control and safety-relevant data (attitude, air speed, ground speed, collision-avoidance data etc.), and/or estimation units and output units, which are known to the skilled person and not shown here. The at least one sensor 4 and said other sensors provide aircraft status data SD which can be used by flight control unit 2. Likewise, said estimation units and output units can provide respective estimation data and output data, which is not shown here. In this way, flight control unit 2 by means of suitable algorithms—using known state feedback control laws (which for MAV-VTOL comprise, e.g., attitude, altitude, position/velocity control, path/trajectory tracking etc.) can compute a desired control input $u_p$, e.g., based on the system dynamics described in Equation 1. This, however, needs to be distributed to the physical actuators 3 using actual control inputs u, one of which is denoted $u_i$ (relating to a given actuator i) and shown in FIG. 1. A sort of inverse matrix computation is needed in order to compute $u_p$ from u. This has been explained in detail above.

Figure 2:
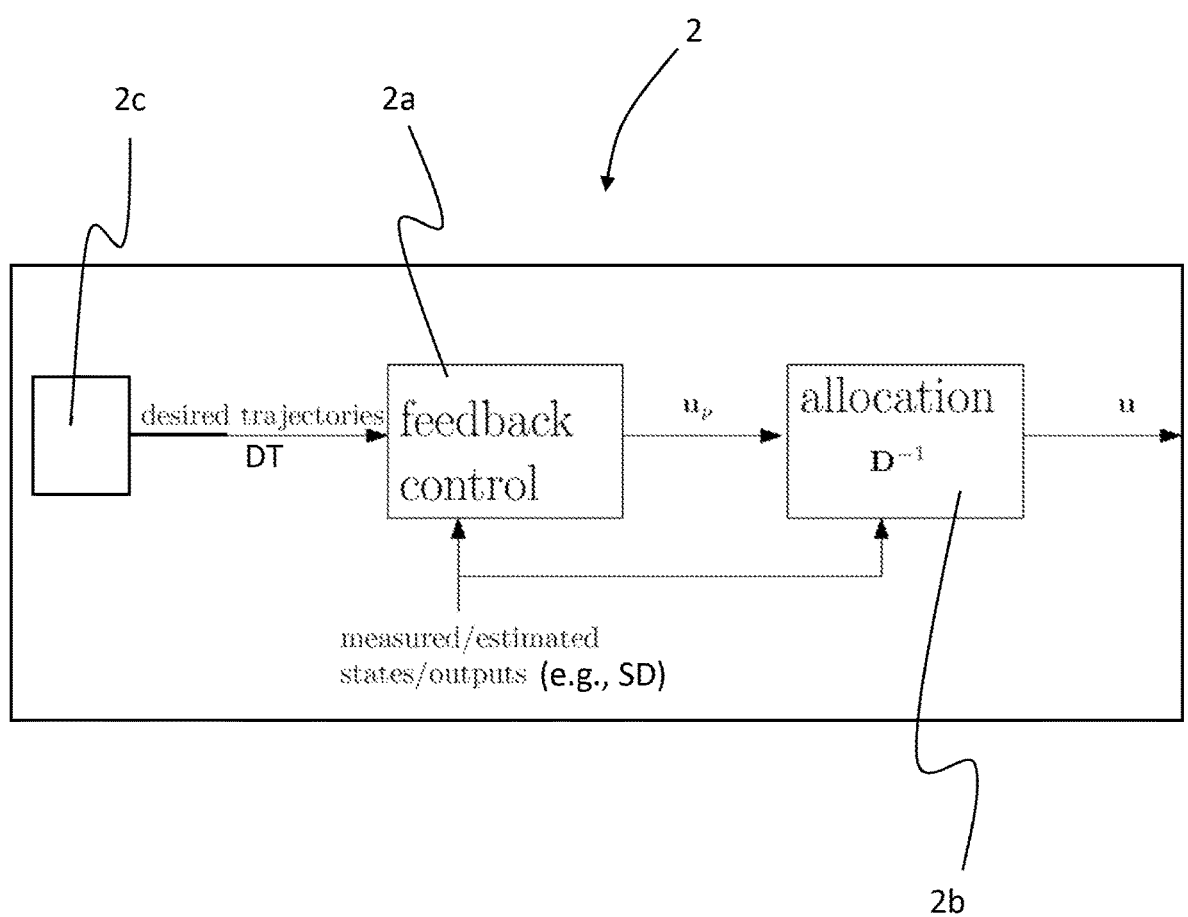
FIG. 2 schematically illustrates an embodiment of a flight control unit comprised in the aircraft of FIG. 1.

FIG. 2 schematically illustrates an embodiment of flight control unit 2 in more detail. Flight control unit 2 comprises a feedback control unit 2a and an allocation unit 2b. At reference numeral 2c, a motion planning unit is provided, which calculates and provides desired flight trajectories DT to feedback control unit 2a. Flight trajectories DT from motion planning unit 2c can be an output of an autopilot algorithm, of a fully autonomous flight computer or of a reference dynamics block mapping the pilot inputs to smooth and bounded outputs for stable, robust and better handling qualities. Feedback control unit 2a is adapted to receive relevant data relating to a state of aircraft 1, e.g., sensor data SD and more, in order to determine desired control output $u_p$ from desired flight trajectories DT. Sensor data SD is not limited to data coming only from motors, as schematically depicted by FIG. 2. Sensor data SD to be used in state feedback control unit 2a typically comes mainly from IMUs, barometers, GNSS, etc. Such components typically are placed remote from propulsion units. A feedback from the propulsion units can also be used, although it is not necessary for feedback control. Desired control output $u_p$ is then provided to allocation unit 2b, which comprises computing means that perform the prioritizing algorithm explained further up. In other words: allocation unit 2b receives said desired control input $u_p$ and, by means of said prioritizing algorithm, solves the allocation equation for at least one prioritized component of $u_p$ before solving said allocation equation for the remaining components of $u_p$, as explained in detail further up. An output of the corresponding calculations is then provided to the individual actuators 3 in the form of actual control input $u_1$. Data SD from sensors 4 (or other sources; cf. above) can be used to enhance performance, e.g., by providing control feedback to either feedback control unit 2a and/or allocation unit 2b however, this is not required.

Figure 3:
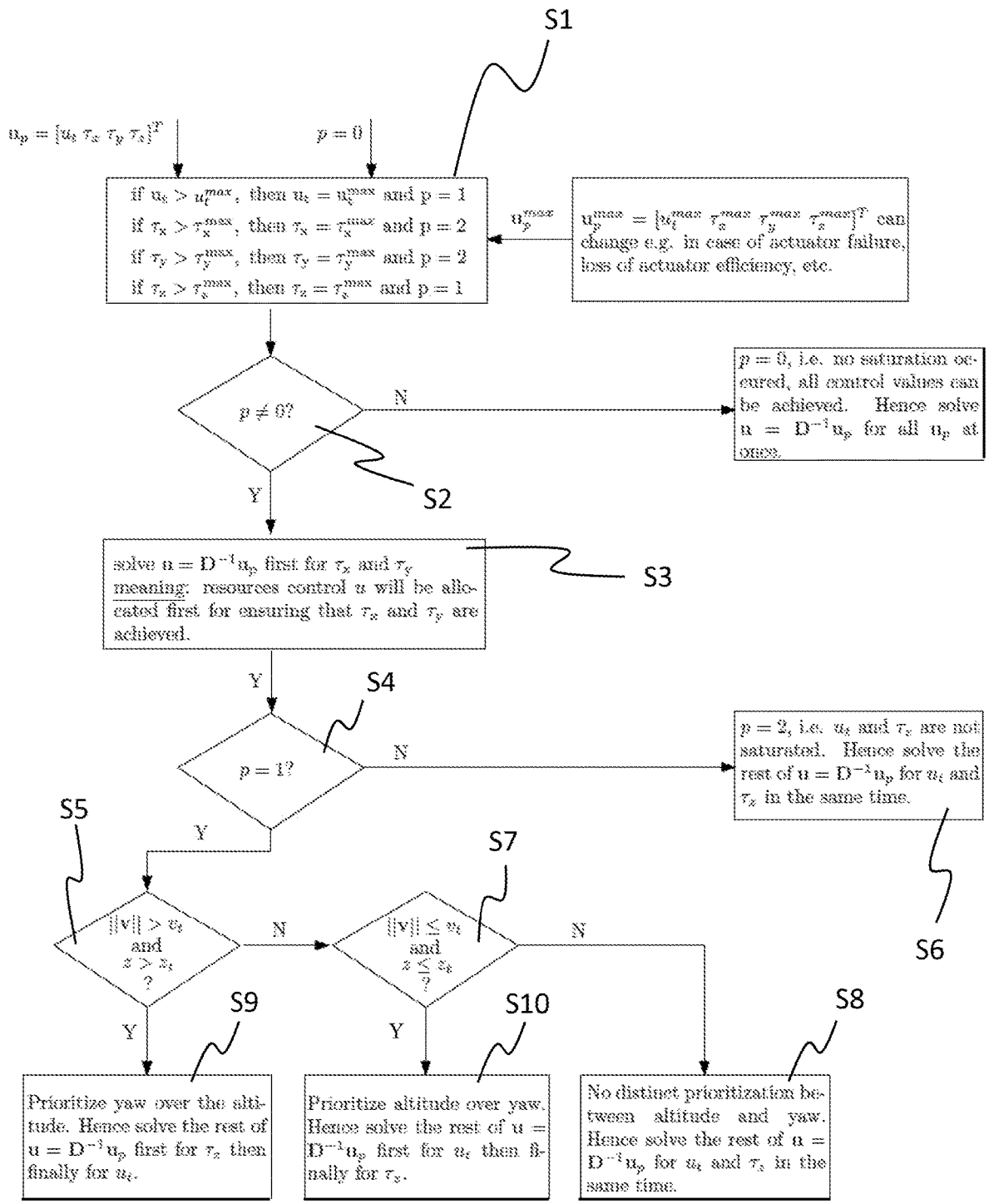
FIG. 3 shows detailed logic of an embodiment of a prioritizing algorithm comprised in a method according to the invention.

FIG. 3 shows detailed logic of an embodiment of a prioritizing algorithm comprised in a method according to the invention.

Input variables are $u_p=[u_t,\tau_x,\tau_y,\tau_z]^T \in \mathbb{R}^4$, where $u_t$ is a collective thrust, and $\tau_*$ are body-fixed frame control torques around the body axes, which are $*=\{x,y,z\}$, $\tau_x$ being a roll torque, $\tau_y$ being a pitch torque, and $\tau_z$ being a yaw torque and a parameter p (for priority) an initial value of which is zero.

The maximum thrust and the maximum torques the aircraft can generate (or maximum allowed thrust and torques considering the physical limitations of the aircraft) are known. This has been previously defined as $u_p^{max}$. $u_p^{max}$ is a further input value which can change due to actuator failure etc. If a desired control input $u_p$ as determined from feedback control law (i.e., by means of said feedback control unit) is greater than or equal to $u_p^{max}$ for at least one of $u_t,\tau_x,\tau_y,\tau_z$, i.e., collective thrust as well as torques around roll, pitch and yaw axes, respectively, then a prioritization between collective thrust and these three torques will be required. This is shown at S1 in FIG. 3 and implies setting p to a value other than zero, i.e., p=1 or p=2, depending on which one of $u_t$, $\tau_x$, $\tau_y$, $\tau_z$ has reached saturation (e.g., $\tau_z > \tau_z^{max}$). Furthermore, the respective component $u_t,\tau_x,\tau_y,\tau_z$ of $u_p$ is set to its maximum value.

At S2, it is checked whether or not p≠0. In the affirmative (Y), the method continues at S3. Otherwise (N), there has been no saturation, and $u=D^{-1}u_p$ is solved for all $u_p$ (i.e., the components thereof) at once.

Now, if some of the actuators reach to some sort of saturation (or are lost), i.e. p≠0, then at least one of said dimensions (or components) of $u_p$ has to be given priority over another. In the example of FIG. 3, $\tau_x$ (roll torque) and $\tau_y$ (pitch torque) are always prioritized over other components of $u_p$ in step S3. $u=D^{-1}u_p$ is first solved for $\tau_x$ and $\tau_y$, which means that control resources are allocated such that desired values for $\tau_x$ and $\tau_y$ can be achieved.

Then, at S4, it is checked whether or not p=1 (cf. step S1). In the affirmative (Y), the method continues at S5. Otherwise (N), p=2 which means that there has been no saturation for $u_t$ and $\tau_z$, and $u=D^{-1}u_p$ is solved for $u_t$ and $\tau_z$ at the same time (S6).

At S5, $\tau_z$ (yaw torque) is prioritized over $u_t$ (collective thrust, altitude), if a translational (especially a horizontal) velocity v of the aircraft is greater than a threshold value $v_t$ (given, e.g., in m/s; i.e., $\|v\|>v_t$) and if an altitude z of the aircraft is greater than another threshold value $z_t$ (given, e.g., in meters). In this way, in case a prioritization is needed and if the aircraft is sufficiently away from the ground at sufficiently high velocity, a heading of the aircraft is protected, while height is sacrificed instead.

In case one of the comparisons at S5 yields a negative result (N), the method continues at S7. $u_t$ is then prioritized over $\tau_z$, if the translational velocity of the aircraft is less than or equal to said threshold value $v_t$ (i.e., $\|v\| \leq v_t$) and if an altitude of the aircraft is less than or equal to said threshold value $z_t$ (i.e., $z \leq z_t$). In this way, in case a prioritization is needed and if the aircraft is near ground, altitude is protected, and yaw alignment is sacrificed instead. If one of the comparisons at S7 yields a negative result (N), the method continues at S8. S8 implies that there is no prioritization between altitude $u_t$ and yaw $\tau_z$, and $u=D^{-1}u_p$ is solved for $u_t$ and yaw $\tau_z$ at the same time (after it was solved for $\tau_x$ and $\tau_y$).

In case both comparisons at S5 yield a positive result (Y), the method continues at S9, wherein yaw $\tau_z$ is prioritized over altitude $u_t$, i.e., $u=D^{-1}u_p$ is solved first for $\tau_z$ and then for $u_t$.

In case both comparisons at S7 yield a positive result (Y), the method continues at S10, wherein altitude $u_t$ is prioritized over yaw $\tau_z$, i.e., $u=D^{-1}u_p$ is solved first for $u_t$ and then for $\tau_z$.

Figure 4:
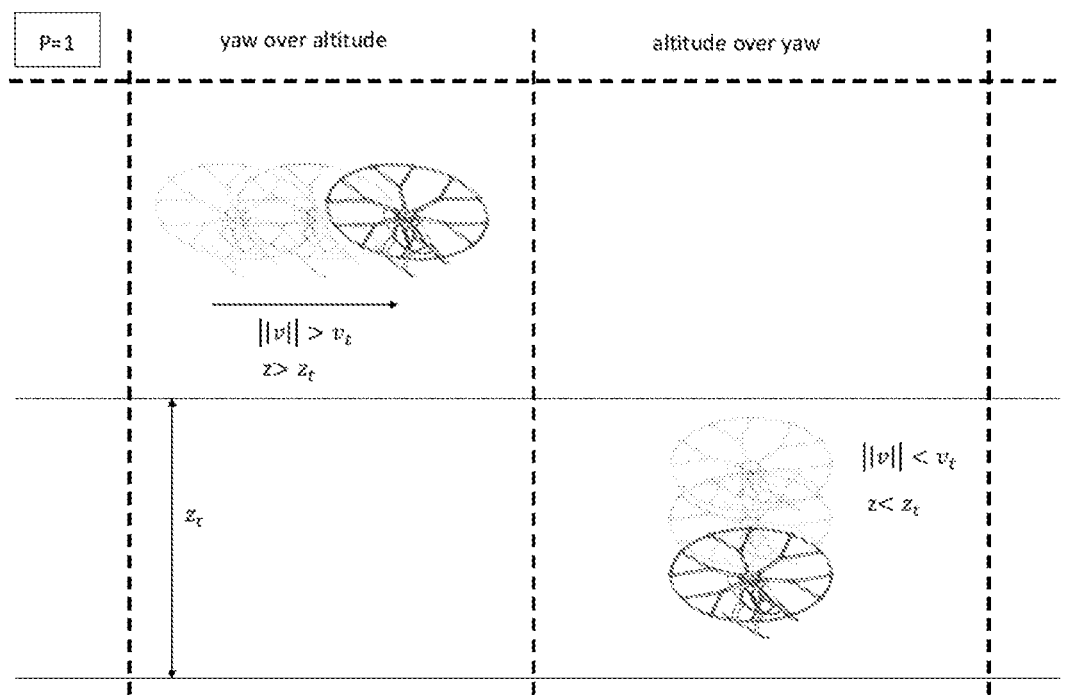
FIG. 4 illustrates details of the algorithm in FIG. 3.

Steps S5 and S7 are illustrated schematically in FIG. 4, which is otherwise self-explanatory.

Figure 5:
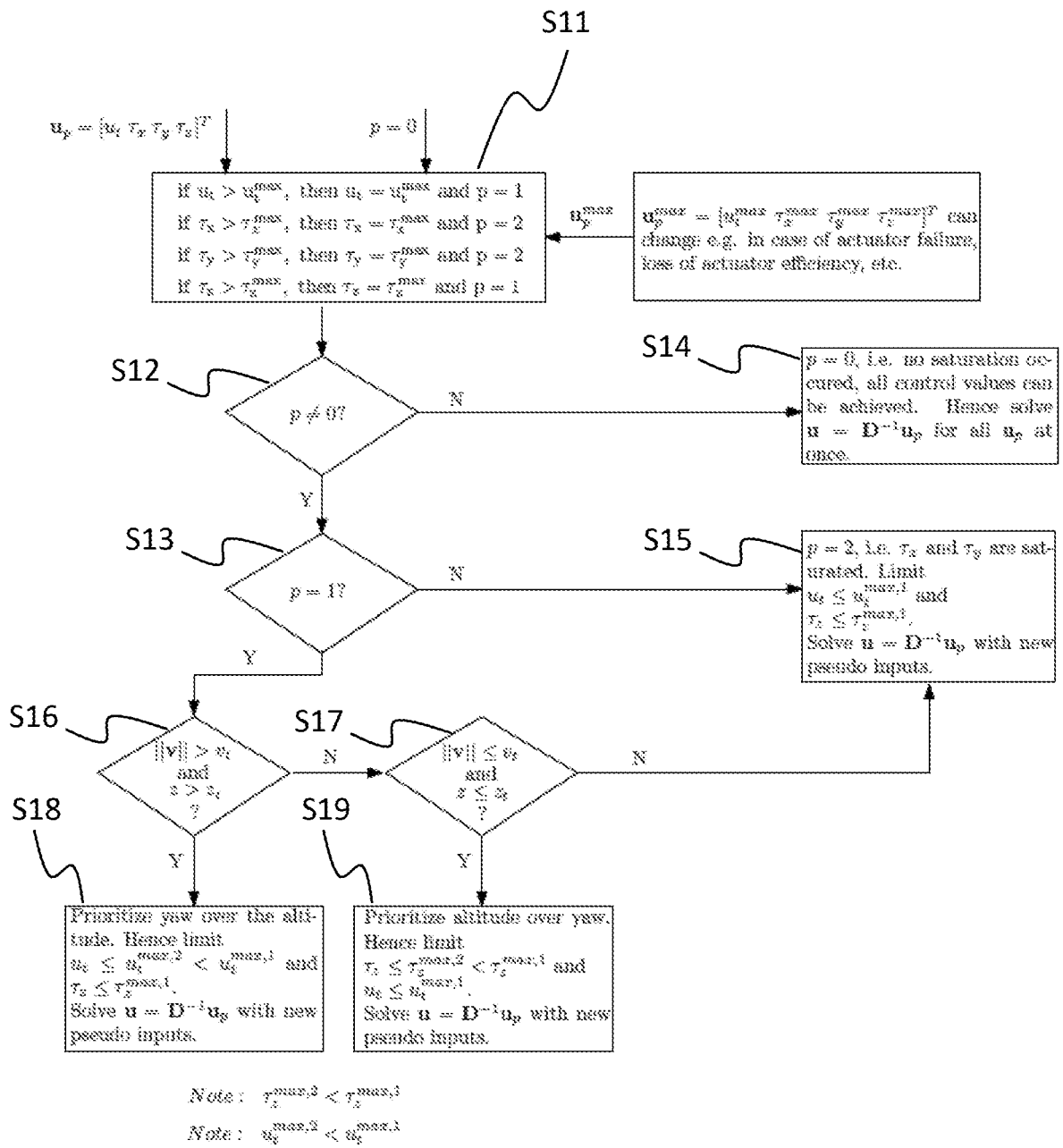
FIG. 5 shows detailed logic of an embodiment of an alternative prioritizing algorithm comprised in a method according to the invention.

FIG. 5 shows detailed logic of an embodiment of an alternative prioritizing algorithm comprised in a method according to the invention. In particular, FIG. 5 refers to an embodiment of the algorithm dealing with state feedback control.

Input variables are $u_p=[u_t\tau_x\tau_y\tau_z]^T \in \mathbb{R}^4$, where $u_t$ is a collective thrust, and $\tau_*$ are body-fixed frame control torques around the body axes, which are $*=\{x,y,z\}$, $\tau_x$ being a roll torque, $\tau_y$ being a pitch torque, and $\tau_z$ being a yaw torque and a parameter p (for priority) an initial value of which is zero.

The maximum thrust and the maximum torques the aircraft can generate (or maximum allowed thrust and torques considering the physical limitations of the aircraft) are known. This has been previously defined as $u_p^{max}$. $u_p^{max}$ is a further input value which can change due to actuator failure etc. (cf. top left in FIG. 5).

If a desired control input $u_p$ as determined from feedback control law (i.e., by means of said feedback control unit) is greater than or equal to $u_p^{max}$ for at least one of $u_t,\tau_x,\tau_y,\tau_z$, i.e., collective thrust as well as torques around roll, pitch and yaw axes, respectively, then a prioritization between collective thrust and these three torques will be required. This is shown at S11 in FIG. 5 and implies setting p to a value other than zero, i.e., p=1 or p=2, depending on which one of $u_t,\tau_x,\tau_y,\tau_z$ has reached saturation (e.g., $\tau_z > \tau_z^{max}$). Furthermore, the respective component $u_t,\tau_x,\tau_z$ of $u_p$ is set to its maximum value, $u_p^{max}$.

At S12, it is checked whether or not p≠0. In the affirmative (Y), the method continues at S13. Otherwise (N), there has been no saturation, and $u=D^{-1}u_p$ is solved for all $u_p$ (i.e., the components thereof) at once, step S14.

Now, if some of the actuators reach to some sort of saturation (or are lost), i.e., p≠0, ("Y" at S12) then at least one of said dimensions (or components) of $u_p$ has to be given priority over another.

In the example of FIG. 5, $\tau_x$ (roll torque) and $\tau_y$ (pitch torque) are prioritized over other components of $u_p$ in step S15 ("N" in step S13). $u_t$ and $\tau_z$ are then limited according to $u_t \leq u_t^{max,1}$, $\tau_z \leq \tau_z^{max,1}$, and $u=D^{-1}u_p$ is solved with new pseudo inputs. Note that in this step, both control thrust and yaw torque are bounded by respective values $u_t^{max,1}$ (for example 90% of $u_t^{max}$) and $\tau_z \leq \tau_z^{max,1}$ (for example 90% of $\tau_z^{max}$).

At S13, it is checked whether or not p=1. In the affirmative (Y), the method continues at S16. Otherwise (N), p=2, the method continues at S15, as explained above.

At S16, it is checked if a translational (especially a horizontal) velocity v of the aircraft is greater than a threshold value $v_t$ (given, e.g., in m/s; i.e., $\|v\| > v_t$) and if an altitude z of the aircraft is greater than another threshold value $z_t$ (given, e.g., in meters). In this way, in case a prioritization is needed and if the aircraft is sufficiently away from the ground at sufficiently high velocity, a heading of the aircraft is protected, while height is sacrificed instead (cf. S18).

In case one of the comparisons at S16 yields a negative result (N), the method continues at S17. This involves checking if the translational velocity of the aircraft is less than or equal to said threshold value $v_t$ (i.e., $\|v\| \leq v_t$) and if an altitude of the aircraft is less than or equal to said threshold value $z_t$ (i.e., $z \leq z_t$). In this way, in case a prioritization is needed and if the aircraft is near ground, altitude is protected, and yaw alignment is sacrificed instead, cf. S19.

If one of the comparisons at S17 yields a negative result (N), the method continues at S15, as explained above.

In case both comparisons at S16 yield a positive result (Y), the method continues at S18, wherein yaw $\tau_z$ is prioritized over altitude $u_t$. $u_t$ and $\tau_z$ are then limited according to $u_t \leq u_t^{max,2} < u_t^{max,1}$, $\tau_z \leq \tau_z^{max,1}$, and $u=D^{-1}u_p$ is solved with new pseudo inputs. Note that in this step, control thrust is bounded with a more conservative value compared to the yaw torque (for example $u_t^{max,2}$ is 80% of $u_t^{max}$, and $u_t^{max,1}$ is 90% of $u_t^{max}$).

In case both comparisons at S17 yield a positive result (Y), the method continues at S19, wherein altitude $u_t$ is prioritized over yaw $\tau_z$, $\tau_z$ and $u_t$ are then limited according to $\tau_z \leq \tau_z^{max,2} < \tau_z^{max,1}$, $u_t \leq u_t^{max,1}$, and $u=D^{-1}u_p$ is solved with new pseudo inputs. Note that in this step, control yaw torque is bounded with a more conservative value compared to the control thrust (for example $\tau_z^{max,2}$ is 80% of $\tau_z^{max}$, and $\tau_z^{max,1}$ is 90% of $\tau_z^{max}$).

The invention claimed is:

1. A method of operating an under-actuated actuator system comprising a plurality of actuators (3), wherein said actuators (3) comprise individual propulsion units of a multiactuator aerial vehicle (1), each one of the actuators having a maximum physical capacity $u^{max}$, the method comprising:

controlling the actuators (3) with an actual control input $u \in \mathbb{R}^k$ computed from an allocation equation $$u=D^{-1}u_p,$$

wherein $D^{-1}$ is an inverse allocation matrix and $u_p \in \mathbb{R}^m$ is a pseudo control input defined by a system dynamics equation $$M(x)\ddot{x}+c(x,\dot{x})+g(x)+G(x)u_p=f_{ext},$$

wherein $x \in \mathbb{R}^n$ is an n-dimensional configuration vector of the system, $M(x) \in \mathbb{R}^{n \times n}$ is a state dependent generalized moment of inertia, $c(x,\dot{x}) \in \mathbb{R}^n$ are state dependent Coriolis forces, $g(x) \in \mathbb{R}^n$ are gravitational forces, $f_{ext} \in \mathbb{R}^n$ are external forces and torques, and $G(x) \in \mathbb{R}^{n \times n}$ is a control input matrix which contains information of under-actuation, where the system is said to be under-actuated if Rank $(G(x)) < n$ or both under-actuated and overly determined in case of k>m>n and Rank $(G(x)D) < n$, with k,m,n $\in \mathbb{R}$;

using a feedback control to recurrently compute a desired pseudo control input $u_p$ from said system dynamics equation;

if at least one component of said desired pseudo control input $u_p$ is greater than a corresponding maximum pseudo control input $u_p^{max}$ that can be generated based on said actuator maximum physical capacity $u^{max}$ and based on positions or configuration of the actuators (3) within the system, or if the actuator system comes to a control volume limit, $u_p > u_p^{max}$, without individual ones of the actuators reaching their own limits $u^{max}$, such as if all actuators (3) are close to their respective limits $u^{max}$, prioritizing at least one of the components of $u_p$ over the other of the components of $u_p$; and a) by use of a prioritizing algorithm, solving said allocation equation for said at least one prioritized component of $u_p$ before solving said allocation equation for the remaining components of $u_p$; or b) during state feedback control, adjusting a limiting value of said at least one prioritized component of $u_p$ by an amount, while keeping respective limiting values of the remaining components of $u_p$ essentially constant.

2. The method of claim 1, wherein in case of b), adjusting said limiting value of said at least one prioritized component of $u_p$ by an amount comprises reducing said limiting value.

3. The method of claim 1, wherein in case of a), at least one of the components of $u_p$ is pre-selected, and solving said allocation equation comprises solving said allocation equation for said at least one pre-selected component of $u_p$ before solving said allocation equation for the other components of $u_p$.

4. The method of claim 3, wherein in case of a plurality of pre-selected ones of the components of $u_p$, solving said allocation equation for said pre-selected components of $u_p$ comprises solving said allocation equation for said plurality of pre-selected components of $u_p$ at a same time as solving said allocation equation for said other components of $u_p$.

5. The method of claim 4, wherein solving said allocation equation at the same time is performed if said at least one component of said desired $u_p$ which is greater than said corresponding maximum pseudo control input $u_p^{max}$ is a pre-selected component of $u_p$.

6. The method of claim 5, wherein, if said at least one component of said desired $u_p$ which is greater than said corresponding maximum pseudo control input $u_p^{max}$ is not a pre-selected component of $u_p$, at least one physical threshold value is defined and compared to a current value of a corresponding state variable of the system; and wherein an order of solving said allocation equation for the other components of $u_p$ is determined based on a result of said comparison.

7. The method of claim 1, wherein, $u_p = [u_t, \tau_x, \tau_y, \tau_z]^T \in \mathbb{R}^4$, where $u_t$ is a collective thrust, and $\tau_*$ are body-fixed frame control torques around the body axes, which are $* = \{x,y,z\}$, $\tau_x$ being a roll torque, $\tau_y$ being a pitch torque, and $\tau_z$ being a yaw torque.

8. The method of claim 7, wherein the roll torque $\tau_x$ and the pitch torque $\tau_y$ are pre-selected, and solving said allocation equation comprises solving said allocation equation for said at least one pre-selected component of $u_p$ before solving said allocation equation for the other components of $u_p$.

9. The method of claim 8, wherein the yaw torque $\tau_z$ and the collective thrust $u_t$ are considered as other components of $u_p$.

10. The method of claim 9, wherein if said at least one component of said desired $u_p$ which is greater than said corresponding maximum pseudo control input $u_p^{max}$ is not a pre-selected component of $u_p$, at least one physical threshold value is defined and compared to a current value of a corresponding state variable of the system; and wherein an order of solving said allocation equation for the other components of $u_p$ is determined based on a result of said comparison, and the yaw torque $\tau_z$ is prioritized over collective thrust $u_t$, if a translational velocity v of the multiactuator aerial vehicle (1) is greater than a first threshold value $v_t$ and if an altitude z of the multiactuator aerial vehicle (1) is greater than a second threshold value $z_t$.

11. The method of claim 10, wherein the collective thrust $u_t$ is prioritized over the yaw torque $T_z$, if the translational velocity v of the multiactuator aerial vehicle (1) is less than or equal to a first threshold value $v_t$ and if an altitude z of the multiactuator aerial vehicle (1) is less than or equal to a second threshold value $z_t$.

12. An aircraft (1), comprising:
a flight control unit (2) including a feedback control unit (2a) and an allocation unit (2b),
an actuator system comprising a plurality of actuators (3), wherein said actuators (3) comprise individual propulsion units of the aircraft (1), said actuators (3), during operation, are adapted to receive, from the flight control unit (2), a control input $u \in \mathbb{R}^k$, $k \in \mathbb{N}$, said control input u is determined by at least one computer algorithm performed on said flight control unit (2),
wherein the flight control unit (2), by at least one of: the feedback control unit (2a) or the at least one computer algorithm, is adapted to perform the method according to claim 1; and
the respective control input u is adapted to be supplied by the flight control unit to said actuators (3).

13. The aircraft (1) of claim 12, further comprising:
at least one of: sensor units (4), estimation units, or output units in operative connection with said feedback control unit (2a) for providing sensor data (SD), estimation data, or output data, respectively, representative of a physical and operational state of the aircraft (1) to said feedback control unit (2a), and the flight control unit (2) is configured to determine said desired pseudo control input $u_p$ from said sensor data (SD), estimation data or output data, respectively.

14. The aircraft (1) of claim 13, further comprising:
the at least one of sensor units (4), estimation units or output units are in operative connection with said allocation unit (2b) for providing the sensor data (SD), estimation data or output data, respectively, representative of the physical and operational state of the aircraft (1) to said allocation unit, wherein the least one flight control unit (2) is configured to determine said actual control input u from said desired pseudo control input $u_p$ and from said sensor data (SD), estimation data or output data, respectively.

15. The aircraft (1) of claim 14, wherein said feedback control unit (2a) and said allocation unit (2b) are operatively connected and said feedback control unit (2a) is adapted to provide said desired pseudo control input $u_p$ to said allocation unit (2b), said allocation unit (2b) is adapted to solve allocation equation $u = D^{-1} u_p$ and to output control input u to said actuators (3).

* * * * *